Oct. 19, 1948.  J. EVANS  2,451,724
SUPER HIGH FREQUENCY WATTMETER
Original Filed Aug. 31, 1943
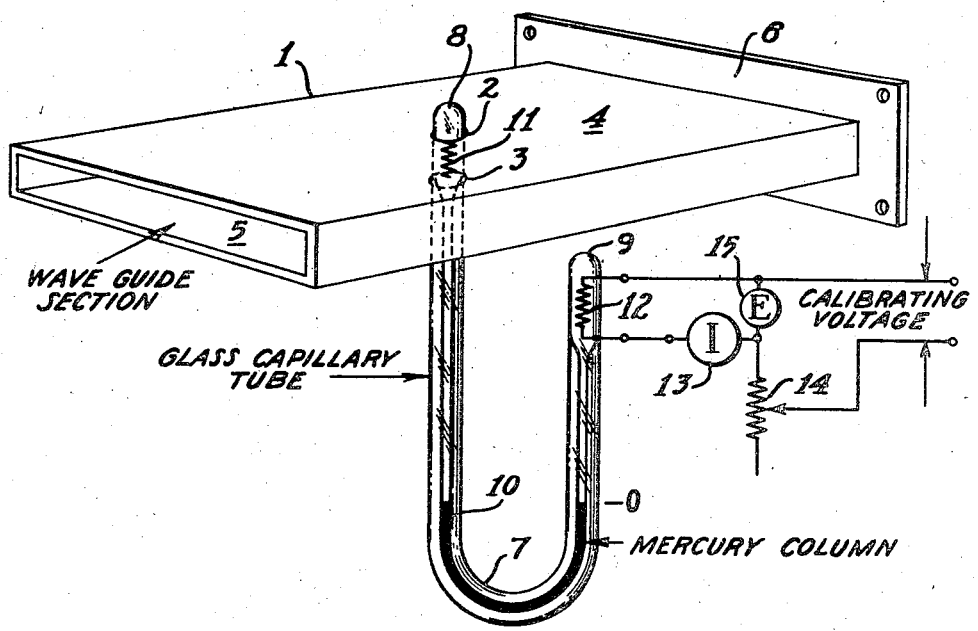
INVENTOR.
John Evans
BY
ATTORNEY Patented Oct. 19, 1948

2,451,724

UNITED STATES PATENT OFFICE 2,451,724

SUPER HIGH FREQUENCY WATTMETER

John Evans, Hightstown, N. J., assignor to Radio Corporation of America, a corporation of Delaware Original application August 31, 1943, Serial No. 500,605, now Patent No. 2,427,094, dated September 9, 1947. Divided and this application December 6, 1945, Serial No. 633,201

2 Claims. (Cl. 171—95)

This application is a division of my copending U. S. application, Serial No. 500,605, filed August 31, 1943, now Patent No. 2,427,094, issued September 9, 1947, assigned to the same assignee as the instant application.

This invention refers generally to super-high-frequency measuring apparatus and more particularly to wattmeters for measuring super-high-frequency energy in a wave guide transmission system.

Heretofore, various methods have been devised for measuring super-high-frequency power transmitted by wave guides. Many of these systems have involved measurements of standing wave reflections in the wave guide transmission system, or have involved separate detection of current and voltage components and means for combining these components to indicate the power. The principal disadvantage encountered with many of the known systems for ultra-high-frequency power measurement is that the apparatus is usually extremely frequency or phase selective whereby inaccurate power measurements result from slight frequency or phase deviations from some predetermined value. An embodiment of the instant invention described in detail hereinafter comprises means for absorbing of the super-high-frequency energy transmitted by a wave guide transmission system, generating heat in response to said absorbed energy, operating indicating means in response to said generated heat, and calibrating said indicating means. The calibration may be made by an auxiliary heat generating device actuated by a calibrated power source.

A preferred embodiment of the invention comprises a short section of wave guide adapted to be connected to a wave guide transmission system. The wave guide transmission section includes two oppositely disposed apertures in the widest parallel faces of the wave guide section. A capillary U tube, having enlarged blown portions in each end thereof, includes two similar resistive elements, one of which is disposed in each of the blown capillary tube portions. One of the resistive elements is disposed within the wave guide section by inserting one end of the U tube in the oppositely disposed apertures whereby the resistive element acts as an efficient antenna for energy transmitted by the wave guide. Preferably the value of the resistive element is of the order of the surge impedance of the wave guide transmission system. The remaining resistive element is connected through suitable power measuring instruments to a calibrated power source.

Heat will be generated in the first resistive element disposed within the first wave guide section by currents induced therein by the super-high-frequency field in the wave guide. The resultant heat will expand the gas in the capillary tube and tend to displace a mercury column therein an amount proportional to the heat generated in the resistive element. The calibrated power or voltage source connected to the second resistor is then adjusted until heat generated by the second resistor neutralizes the displacement of the mercury column caused by the heat generated by the first resistor. The power absorbed by the first resistor from the wave guide section may then be determined directly from the amount of power, indicated by the power indicating apparatus, required to neutralize this effect.

Among the objects of the invention is to provide an improved method of and means for measuring super-high-frequency energy. Another object of the invention is to provide an improved method of and means for measuring super-high-frequency energy transmitted by a wave guide transmission system. A further object of the invention is to provide an improved method of and means for measuring power in a super-high-frequency wave guide transmission system by means of indicating apparatus responsive to heat generated in a resistive element inserted within the wave guide for absorbing energy therefrom. A further object of the invention is to provide an improved method of and means for measuring power in a super-high-frequency wave guide transmission system wherein power absorbed in the form of heat by the measuring apparatus provides indications which may be calibrated by externally adjustable power measuring means.

The invention will be further described by reference to the accompanying drawing of which the single figure is a schematic diagram of a preferred embodiment thereof.

Referring to the drawing, a wave guide section 1 having oppositely disposed apertures 2, 3 in the wide parallel faces 4, 5 thereof, includes a flanged portion 6 adapted for engagement with a similar flanged portion of a conventional rectangular wave guide transmission system. A U-shaped capillary tube 7 includes a first hollow blown portion 8 terminating one end thereof, and a second hollow blown portion 9 terminating the remaining end thereof. The capillary portion of the U tube 7, intermediate the blown portions 8, 9, includes a mercury column 10.

The first blown portion 8 of the capillary tube 7 encloses a resistive element 11 having a resistance of the order of the surge impedance of the wave guide section. The second blown portion 9 of the U tube 7 encloses a second resistive element 12, which is connected through a current indicating meter 13 and a variable resistor 14 to a source of calibrating voltage, not shown. A voltage indicating meter 15 is connected across the current indicating meter 13 and the second resistor 12. Instead of indicating separately the voltage and current, the indicator may be a wattmeter.

The first resistive element 11 preferably has a length substantially equivalent to one-half wavelength at the operating frequency of the wave guide transmission system, whereby the element functions as an antenna for absorbing energy from the wave guide when it is inserted through the apertures 2, 3 into the interior of the guide.

Heat generated in the first resistive element 11, by means of the high frequency energy absorbed from the wave guide, provides expansion of the gases in the end of the U tube terminated by the first blown portion 8 thereby tending to displace the mercury column 10. The calibrating power applied to the second resistive element 12 may be varied by the variable resistor 14 to provide suitable heating of the second resistor 12 for neutralizing the displacement of the mercury column 10. The product of the current and voltage indicated by the current indicating meter 13 and the voltage indicating meter 15 will, therefore, be a measure of the power absorbed from the first resistor 11 from the wave guide transmission system. The first resistive element 11 is substantially resonant due to its physical dimensions, and has an impedance substantially equal to the surge impedance of the wave guide transmission system, hence, substantially all of the energy available in the wave guide transmission system is absorbed by the resistive element. Therefore, the power indicated by the product of the readings on the indicating meters 13 and 15 will provide a substantially accurate indication of the total power transmitted by the wave guide.

It should be understood that the particular mechanical construction of the embodiment of the invention described is purely illustrative and that there may be various modifications thereof within the spirit and scope of the invention. It should further be understood that the system may be employed for measuring the power of continuous, damped, interrupted or pulsed wave energy, providing the modulation characteristics are taken into consideration in calibrating the electrical power applied to the auxiliary compensating or calibrating resistive element.

I claim as my invention:

1. Apparatus for measuring microwave energy in a waveguide transmission system comprising a first resistive element for translating said microwave energy into heat energy, capillary tube means including a first enlarged portion enclosing said element and extending within said waveguide system and including an indicating liquid column having its position determined by gas pressure responsive to said heat energy, a second resistive element enclosed within a second enlarged portion of said tube external of said waveguide system, an adjustable source of electrical energy for energizing said second resistive element to oppose changes in position of said liquid column by gas pressure responsive to the heat generated in said second element, and calibrated means for adjusting said source to provide comparative indications by the position of said liquid column of the energy applied to each of said resistive elements.

2. Apparatus for measuring microwave energy in a waveguide transmission system comprising a first resistive element substantially matched to the surge impedance of said waveguide system for translating said microwave energy into heat energy, capillary tube means including a first enlarged portion enclosing said element and extending within said waveguide system and including an indicating liquid column having its position determined by gas pressure responsive to said heat energy, a second resistive element enclosed within a second enlarged portion of said tube external of said waveguide system, an adjustable source of electrical energy for energizing said second resistive element to oppose changes in position of said liquid column by gas pressure responsive to the heat generated in said second element, and calibrated means for adjusting said source to provide comparative indications by the position of said liquid column of the energy applied to each of said resistive elements.

JOHN EVANS.

REFERENCES CITED

The following references are of record in the file of this patent:

UNITED STATES PATENTS

| Number | Name | Date |
| --- | --- | --- |
| 1,859,469 | Richardson | May 24, 1932 |
| 1,957,454 | Gebhard | May 8, 1934 |
| 2,151,157 | Schelkunoff | Mar. 21, 1939 |
| 2,212,211 | Pfund | Aug. 20, 1940 |
| 2,387,158 | Kozanowski | Oct. 16, 1945 |
| 2,398,606 | Wang | Apr. 16, 1946 |
| 2,400,777 | Okress | May 21, 1946 |